United States Patent
Bigolin

(10) Patent No.: US 7,625,041 B2
(45) Date of Patent: Dec. 1, 2009

(54) SADDLE WITH QUICK-CONNECTION MEANS TO ATTACH BICYCLE ACCESSORIES

(75) Inventor: Barbara Bigolin, Asolo (IT)

(73) Assignee: Selle Royal SpA, Pozzoleone (IT)

( * ) Notice: Subject to any disclaimer, the term of this patent is extended or adjusted under 35 U.S.C. 154(b) by 0 days.

(21) Appl. No.: 12/067,466

(22) PCT Filed: Sep. 20, 2005

(86) PCT No.: PCT/IB2006/053391

§ 371 (c)(1),
(2), (4) Date: Mar. 20, 2008

(87) PCT Pub. No.: WO2007/034422

PCT Pub. Date: Mar. 29, 2007

(65) Prior Publication Data

US 2008/0203782 A1 Aug. 28, 2008

(30) Foreign Application Priority Data

Sep. 20, 2005 (IT) .......................... VI2005A0242

(51) Int. Cl.
*B60N 2/40* (2006.01)
*B62J 1/00* (2006.01)

(52) U.S. Cl. .............................. 297/195.1; 297/215.16; 297/188.08; 297/188.12

(58) Field of Classification Search ............ 297/188.08, 297/188.12, 195.1, 195.11, 215.16, 463.1
See application file for complete search history.

(56) References Cited

U.S. PATENT DOCUMENTS

| 4,566,617 | A | * | 1/1986 | Jackson ...................... 224/275 |
| 4,662,677 | A | * | 5/1987 | Hughes .................... 297/195.1 |
| 5,190,345 | A | * | 3/1993 | Lin ......................... 297/188.12 |
| 5,593,126 | A | * | 1/1997 | Muderlak ........... 297/188.08 X |
| 5,655,694 | A | * | 8/1997 | Keckeisen .......... 297/188.12 X |
| 5,893,501 | A | * | 4/1999 | Schwimmer ................ 224/427 |
| 6,106,059 | A | * | 8/2000 | Minkow et al. ............. 297/202 |
| 7,264,308 | B2 | | 9/2007 | Bigolin |
| 2009/0108643 | A1 | * | 4/2009 | Yu ........................... 297/195.1 |
| 2009/0152912 | A1 | * | 6/2009 | Yu ........................... 297/195.1 |
| 2009/0189421 | A1 | * | 7/2009 | Yu et al. ................... 297/195.1 |

FOREIGN PATENT DOCUMENTS

| DE | 19839629 | 9/2007 |
| FR | 1248870 | 12/1960 |
| GB | 491480 | 9/1938 |
| GB | 623353 | 5/1949 |

* cited by examiner

*Primary Examiner*—Rodney B White
(74) *Attorney, Agent, or Firm*—Themis Law

(57) ABSTRACT

A multifunction saddle structure, designed to be anchored to a bicycle frame. Includes a tapered front portion and a widened rear portion. Quick-connection means are provided for connection of bicycle accessories to the rear portion. The structure further has an ergonomically shaped peripheral edge, which is at least partly beveled and rounded and has no sharp edges, to define a comfortable and safe grip for a user to enable lifting and handling of the bicycle. The quick-connection means are located along the shaped edge.

14 Claims, 2 Drawing Sheets

SADDLE WITH QUICK-CONNECTION MEANS TO ATTACH BICYCLE ACCESSORIES

FIELD OF THE INVENTION

The present invention generally finds application in the field of sport and leisure accessories, and particularly relates to a multifunction saddle structure.

BACKGROUND OF THE INVENTION

One of the drawbacks associated with two-wheeled vehicles, particularly bicycles and motorcycles, is known to be the limited luggage-carrying capacity of such means of transport. Especially in bicycles, a problem may also arise from the need of carrying emergency equipment and accessories to be used in case of mechanical breakdowns, including screw drivers or wrenches, tires or else.

International application PCT/IB2005/000753, in the name of the same applicant, discloses a quick-connection structure for a bicycle saddle having a male member for carrying a tool and/or equipment kit, to be snap-fitted in a corresponding female receptacle, which is formed integrally and monolithically with the saddle.

While this solution is most effective from several points of view, it can still be improved in terms of comfortable and safe grasp. The above prior art structure cannot solve the problem of ensuring a quick and firm connection/removal of the accessory to be carried to/from the saddle, while allowing a comfortable and safe grasp of the saddle, for easier lifting and handling of the bicycle on which the saddle is fitted.

SUMMARY OF THE INVENTION

The object of this invention is to overcome the above drawbacks, by providing a saddle structure that achieves high efficiency, is relatively cost-effective and has a relatively simple construction.

A particular object is to provide a saddle structure that ensures a quick and firm connection/removal of the accessory to be carried to/from the saddle, while allowing a comfortable and safe grasp of the saddle, for easier lifting and handling of the bicycle on which the saddle is fitted.

Another object of the invention is to provide a structure that does not limit the adjustment of saddle's sliding parts, such as the seat post or the rails.

A further object is to provide a structure having minimum space requirements.

These and other objects, as better explained hereafter, are fulfilled by a multifunction saddle structure, which has a tapered front portion and a widened rear portion, quick-connection means being provided at said rear portion for connection of bicycle accessories.

According to the invention, at its rear portion the structure has an ergonomically shaped peripheral edge, which is at least partly beveled and rounded and has no sharp edges. Furthermore, the quick-connection means are located along said shaped edge.

Thanks to this particular configuration, the structure of the invention can define a comfortable and safe grip portion for the user to lift and handle the bicycle, while ensuring quick and firm connection/removal of the accessory to be carried to/from the saddle.

Advantageously, the shaped edge may also be at least partly inwardly and downwardly inclined, to define a grip portion substantially complementary to the palm of a user's hand.

Suitably, the quick-connection means may be located in the center portion of the shaped edge, so that connection/removal of accessories to/from the bicycle is greatly facilitated and simplified.

Advantageously, the quick-connection means may have at least one male or female member on the shaped edge, preferably but without limitation integral and monolithic therewith, to be coupled to a corresponding female or male member associated to one or more accessories.

According to a first embodiment, the shaped edge may be integral and monolithic with the saddle. Alternatively, it may be defined by a profile made of a rigid or semi-rigid material, to be attached to the saddle by screw and/or snap fit means.

BRIEF DESCRIPTION OF THE DRAWINGS

Further features and advantages of the invention will be more apparent from the detailed description of a preferred, non-exclusive embodiment of a saddle structure according to the invention, which is described as a non-limiting example with the help of the annexed drawings, in which.

DETAILED DESCRIPTION OF A PREFERRED EMBODIMENT

With reference to the above figures, the saddle structure of the invention, generally designated by numeral 1, is of the type that can be classically anchored to a bicycle frame, not depicted as being per se known.

Figure 1:
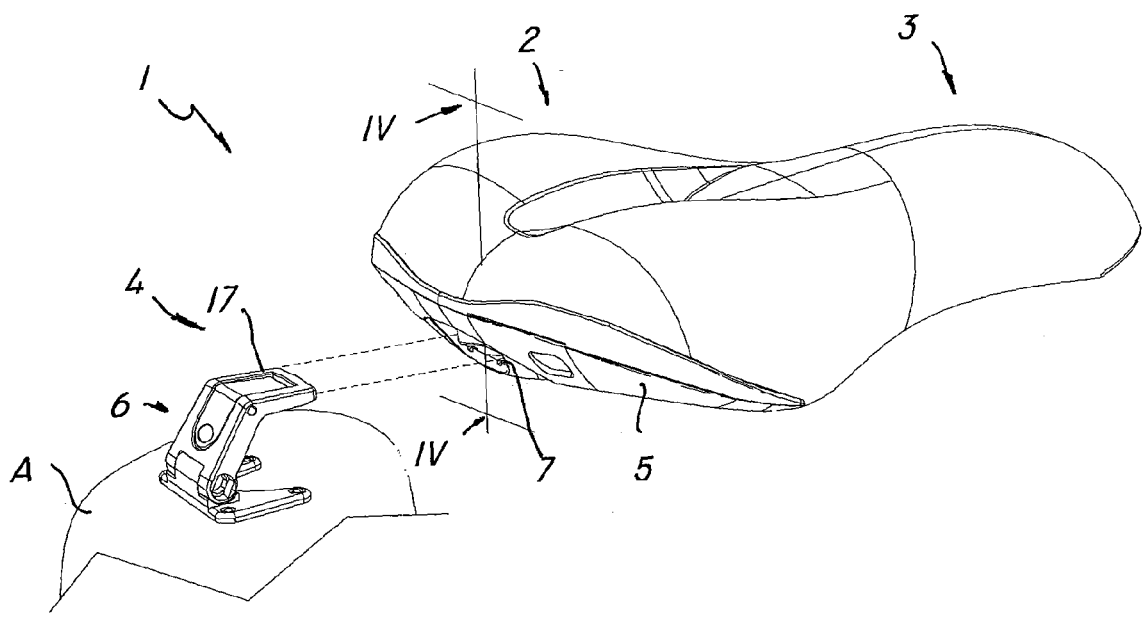
FIG. 1 is a perspective view of a saddle structure according to the invention.

The structure generally includes a widened rear portion 2, which is designed to receive a seated user, and a tapered front portion 3, as shown in FIG. 1. Quick-connection means are provided at the rear portion of the saddle 2 for connection of any accessory indicated with A, which may be a signal light, a reflector or a tool kit, as shown.

A peculiar feature of this invention is that, at the rear portion 2, the saddle has an ergonomically shaped peripheral edge 5, which is at least partly beveled and rounded, with no sharp edges, to define a comfortable and safe grip portion for a user to allow lifting and handling of the bicycle. Furthermore, the quick-connection means, generally designated by numeral 4, are located along the edge 5, to facilitate quick-connection/removal of the accessory A to/from the saddle. An ergonomic and firm grasp is further ensured by forming the edge 5 with an at least partially inwardly and downwardly inclination.

As shown in FIG. 1, the means 4 near the center portion M of the edge 5 include a male member 6 connected to the accessory A and a female member 7 integral and monolithic with the edge 5. It shall be understood that the members 6 and 7 may also be placed on the edge 5 and the accessory A respectively, and the member on the edge 5 may also be non monolithic therewith, without departure from the scope of the invention.

Figure 2:
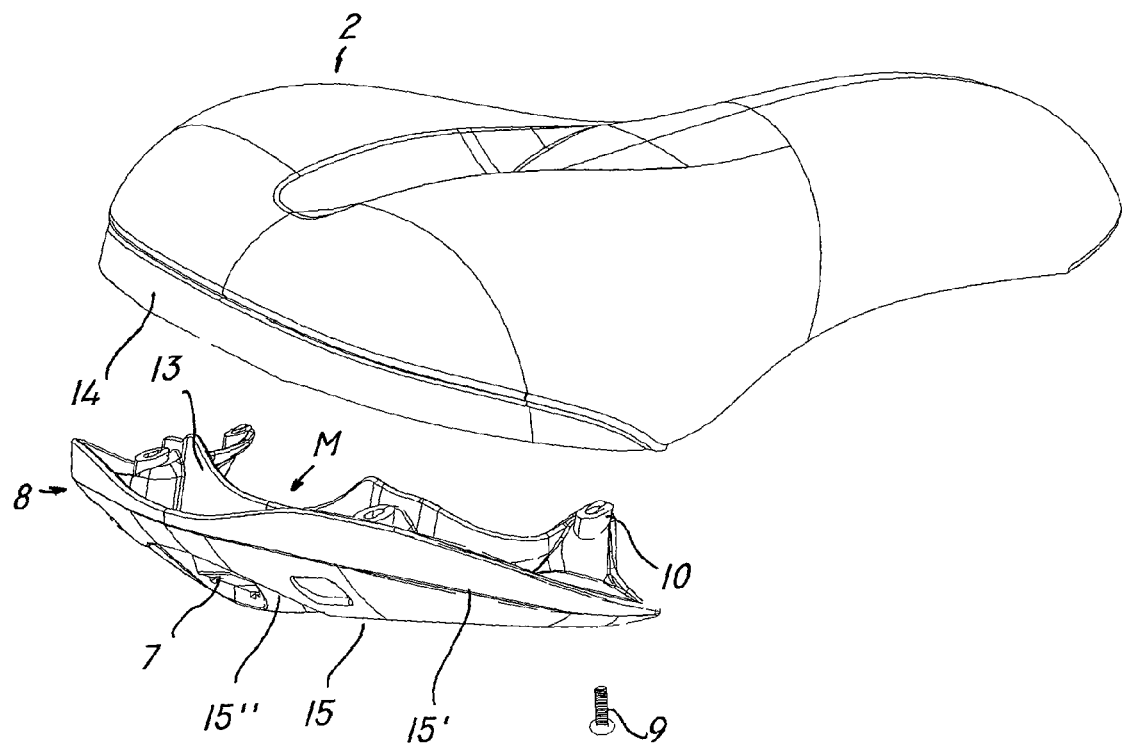
FIG. 2 is a partly exploded view of a particular embodiment of the structure according to the invention.

As particularly shown in FIG. 2, the edge 5 is defined by a profile 8 made of a rigid or semi-rigid material, preferably but without limitation of the polymer type, to be attached to the saddle by means of screws 9 to be received in special slots 10. Otherwise, the edge 5 may be monolithic with the saddle, and the screw fastening means 9 may be replaced by or coupled to snap fitting means, without departure from the scope of the invention.

Figure 3:
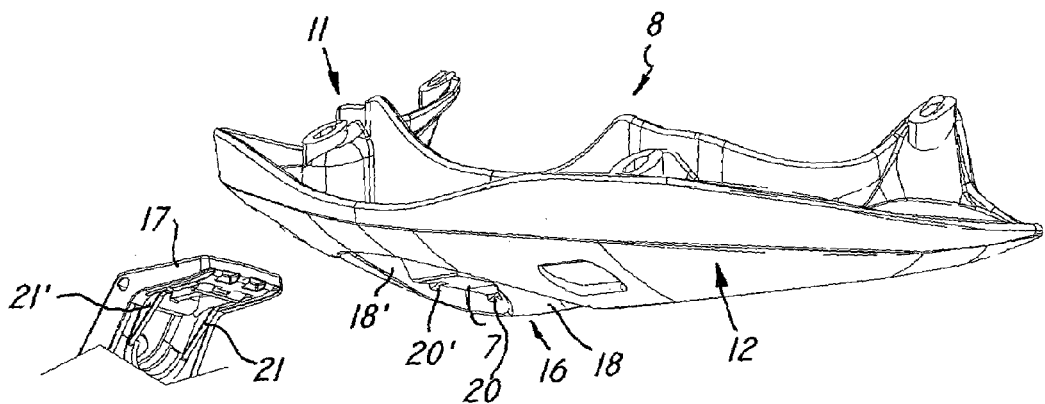
FIG. 3 is a perspective view of a detail of FIG. 2.

As is clearly shown in FIG. 3, the profile 8, which has a horseshoe shape, comprises an internal connecting portion 11 and an external portion 12, the latter being designed to contact the hand of a user.

Advantageously, the internal portion has a longitudinal recess 13 which is designed to be coupled to a corresponding projection 14 at the rear portion 2 of the saddle. On the other hand, the external portion 12 has rounded and/or tapered connecting edges 15, 15', 15" for preventing any accidental injury to a user.

The quick-connection means 4 may be formed as taught by the above mentioned international patent application PCT/IB2005/000753.

In a preferred non-exclusive embodiment, the female member 7 is defined by a slot in a recess 16 of the profile 8, whereas the male member 6 has an elongate extension 17 which is slideably engaged and snap fitted therein.

To assist the sliding motion of the extension 17 in the slot 7, the recess 16 has suitably shaped guide surfaces 18, 18'.

Figure 4:
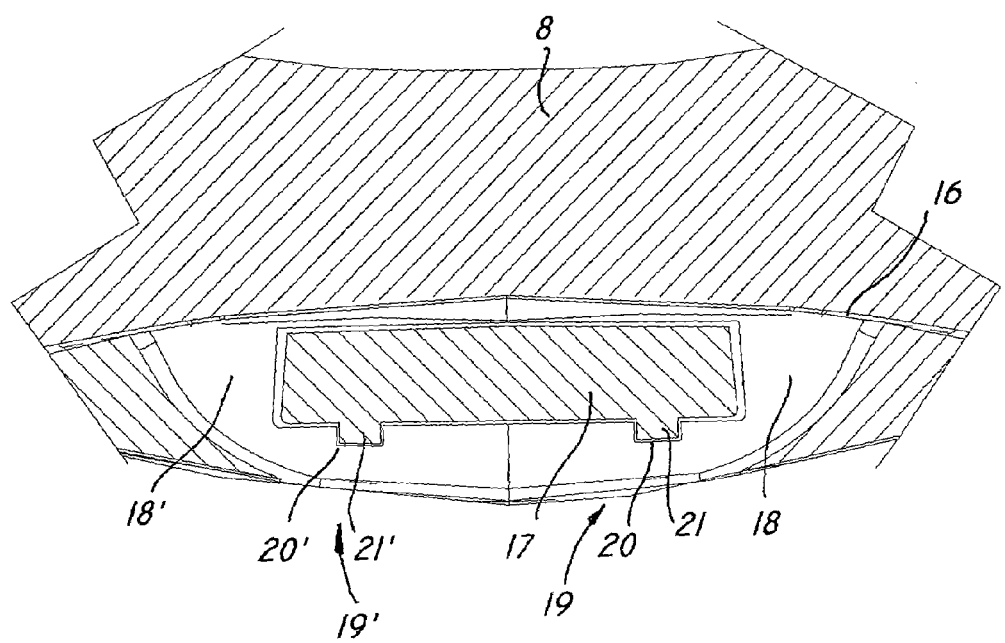
FIG. 4 is a sectional view of the structure of FIG. 1, as taken along a plane IV-IV.

As clearly shown in FIG. 4, to avoid any clearance problems between the elongate extension 17 of the male member 6 and the female member 7, the latter has detent means, generally designated by numerals 19, 19', and preferably comprising a pair of specially shaped receptacles 20, 20', to be engaged by a pair of corresponding guides 21, 21' on the male member 6.

The above disclosure clearly shows that the structure of the invention fulfills the intended objects and particularly the object of providing a saddle structure that ensures a quick and firm connection/removal of the accessory to be carried to/from the saddle, while allowing a comfortable and safe grasp of the saddle.

Thanks to the provision of the edge 5, which is shaped in such a manner as to define a comfortable and safe grip portion for a user, and to the provision of the quick-connection means 4 thereon, a multifunction saddle structure is obtained, allowing a comfortable and pleasant use.

The structure of the invention is susceptible to a number of changes and variants, within the inventive concept disclosed in the appended claims. All the details thereof may be replaced by other technically equivalent parts, and the materials may vary depending on different needs, without departure from the scope of the invention.

While the structure has been described with particular reference to the accompanying figures, the numerals referred to in the disclosure and claims are only used for the sake of a better intelligibility of the invention and shall not be intended to limit the claimed scope in any manner.

The invention claimed is:

1. A saddle structure with quick-connection means for attaching bicycle accessories, comprising:
   a saddle designed to be anchored to a bicycle frame, said saddle having a tapered front portion and a widened rear portion;
   an ergonomically shaped peripheral edge provided in said widened rear portion, said edge being at least partly bevelled and rounded and having no sharp edges such to define a comfortable and safe grip portion for a user; and
   quick-connection means provided at said rear portion, said quick-connection means comprising only one of a male or a female member designed to be coupled to the other one of said male or female member, the other one of said male or female member being configured to be coupled to one or more bicycle accessories,
   wherein said peripheral edge is provided in facing relationship with said widened rear portion under the saddle and is at least partly inwardly and downwardly inclined such to wrap around at least a portion of a lower face of the widened rear portion, said quick-connection means being located below said grip portion along said peripheral edge within a guide surface in order not to interfere with a hand of a user when lifting and handling the bicycle.

2. The structure as claimed in claim 1, wherein said shaped edge is integral and monolithic with said saddle.

3. The structure as claimed in claim 1, wherein said shaped edge is defined by a profile made of a rigid or semi-rigid material, to be attached to the saddle by a screw and/or snap fit.

4. The structure as claimed in claim 3, wherein said profile has an internal connecting portion and an external grip portion.

5. The structure as claimed in claim 4, wherein said connecting portion has a longitudinal recess which is designed to be at least partly coupled to a corresponding projection at said widened rear portion.

6. The structure as claimed in claim 5, wherein said grip portion has rounded and/or tapered connecting edges for preventing any accidental injury to a user.

7. The structure as claimed in claim 1, wherein said quick-connection means are located near the center portion of said shaped edge.

8. The structure as claimed in claim 1, wherein said one of said male member or female member is formed integrally and monolithically with said shaped edge.

9. The structure as claimed in claim 1, wherein said female member is formed integrally and monolithically with said shaped edge.

10. The structure as claimed in claim 9, wherein said female member comprises a slot a slot in a recess of said shaped edge.

11. The structure as claimed in claim 10, wherein said male member has an elongate extension which is slidingly engaged and snap fitted in said slot.

12. The structure as claimed in claim 11, wherein said recess has guide surfaces for assisting the sliding motion of said elongate extension in said slot.

13. The structure as claimed in claim 12, wherein said slot has detent means for said male member.

14. The structure as claimed in claim 13, wherein said detent means comprise a pair of specially shaped receptacles designed to be engaged by a pair of corresponding guides on said male member.

* * * * *